United States Patent
Lynch

[11] 3,902,855
[45] Sept. 2, 1975

[54] MULTI-STAGE COUNTERCURRENT RECRYSTALLIZER COLUMN HAVING SLIP VALVE BETWEEN EACH STAGE

[75] Inventor: Edward J. Lynch, Danville, Calif.

[73] Assignee: The Dow Chemical Company, Midland, Mich.

[22] Filed: Apr. 2, 1973

[21] Appl. No.: 347,165

Related U.S. Application Data
[62] Division of Ser. No. 108,862, Jan. 22, 1971, abandoned.

[52] U.S. Cl. ........ 23/273 MT; 23/273 F; 23/270 R; 23/270.5 T; 23/295 R; 23/302 A; 62/58; 260/561 N
[51] Int. Cl.² .................. B01D 9/02; C07C 103/00
[58] Field of Search ........ 23/273 F, 273 R, 267 MS, 23/270 R, 270.5 R, 270.5 T, 295 R, 302 A, 296, 297, 299; 62/58, 123; 260/561 N

[56] References Cited
UNITED STATES PATENTS

| | | |
|---|---|---|
| 2,034,615 | 3/1936 | Gensecke ........................ 23/273 R |
| 2,034,969 | 3/1936 | Behrens ........................... 23/273 R |
| 2,587,293 | 2/1952 | DeUries ........................... 23/273 R |
| 2,816,822 | 12/1957 | Hess et al. ........................ 23/273 F |
| 2,862,797 | 12/1958 | McKay ............................ 23/273 F |
| 3,013,780 | 12/1961 | Wistrich ........................ 23/270.5 T |
| 3,192,126 | 6/1965 | Fear ............................. 23/270.5 T |
| 3,607,392 | 9/1971 | Lauer ............................. 23/273 R |
| 3,681,932 | 8/1972 | Huber ........................... 23/273 MT |
| 3,687,636 | 8/1972 | Dambrine et al. ............... 23/273 R |
| 3,762,880 | 10/1973 | Tisdel ............................. 23/300 |

Primary Examiner—Norman Yudkoff
Assistant Examiner—S. J. Emery
Attorney, Agent, or Firm—David H. Thurston; Glwynn R. Baker

[57] ABSTRACT

Acrylamide which is essentially free of crosslinking impurities is obtained by multiple recrystallizations from water solution wherein the mother liquor from each recrystallization is used as the aqueous medium in the preceding recrystallization. A unitary apparatus for carrying out the process is described.

1 Claim, 3 Drawing Figures

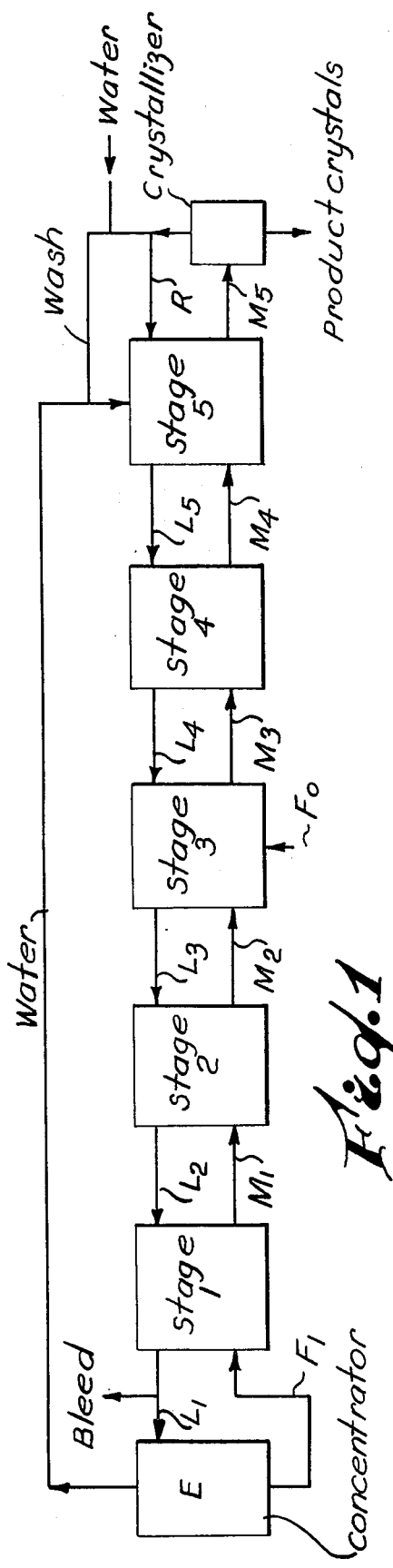
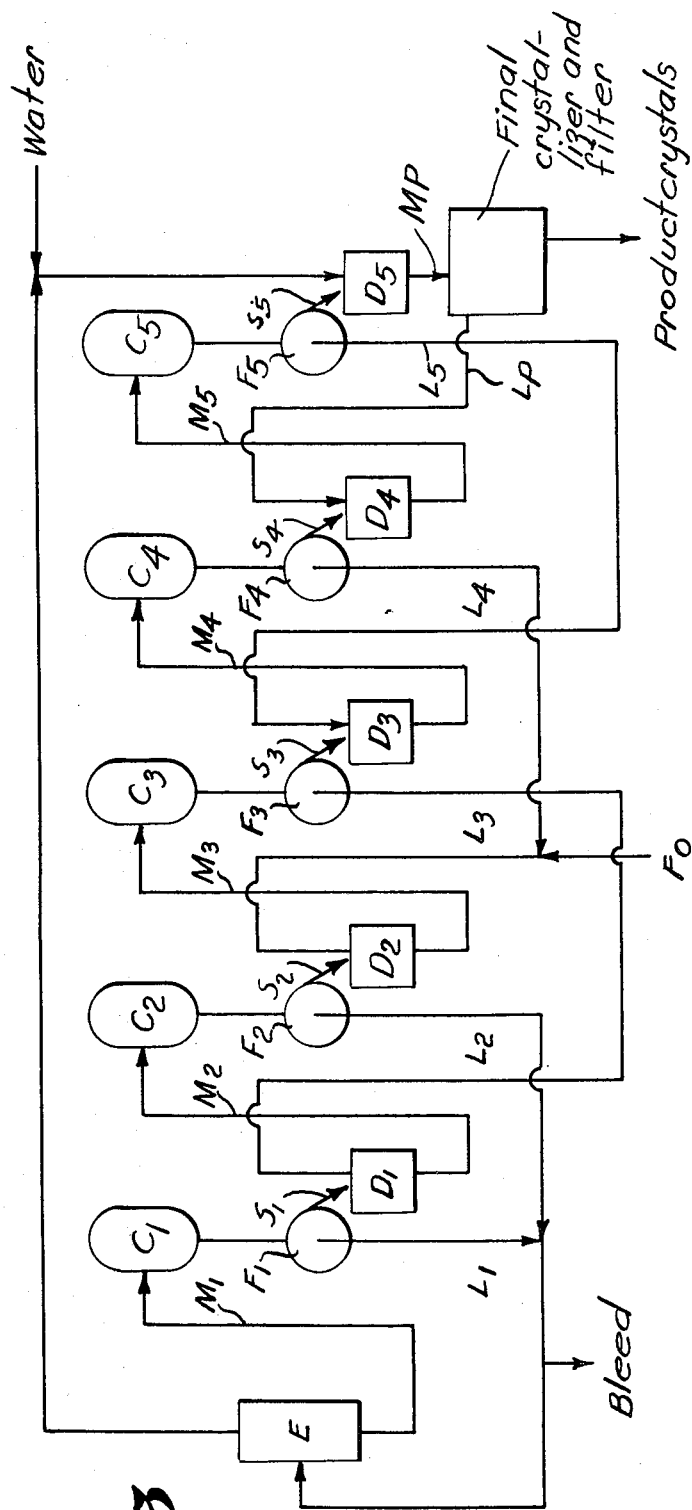

MULTI-STAGE COUNTERCURRENT RECRYSTALLIZER COLUMN HAVING SLIP VALVE BETWEEN EACH STAGE

This application is a division of U.S. Ser. No. 108,862 filed 1/22/71, now abandoned.

BACKGROUND OF THE INVENTION

This invention relates to a process whereby a crystalline solid is purified by repeated crystallizations from its water solution under particularly defined conditions. It also relates to a unitary apparatus whereby any such multiple crystallization process is operated.

Acrylamide is manufactured on a commercial scale by the partial hydrolysis of acrylonitrile. A widely used process accomplishes the hydrolysis by heating a mixture of acrylonitrile and sulfuric acid in the presence of a metal salt to prevent polymerization. The acrylamide sulfate thereby obtained is neutralized with aqueous ammonia or other base and the free acrylamide is obtained as an aqueous solution or a crystalline solid by any of various concentration and partial crystallization techniques, many modifications of which are well known in the art.

The acrylamide so obtained is of relatively high purity although small amounts of inorganic salts and some organic impurities are characteristically present in the product. Particularly undesirable for the purpose of making water-soluble polymers of high molecular weight are difunctional organic byproducts such as diacrylamide and alkylidenebisacrylamides which cause cross-linking during the polymerization process with consequent loss of solubility and lowered molecular weight in the polymer product. Recrystallization from various solvents has been suggested in the past for the removal of such impurities from acrylamide monomer. Organic solvents such as aromatic hydrocarbons, chlorinated aliphatic hydrocarbons, and lower aliphatic alcohols are known for the purpose. Acrylamide has also been crystallized and subjected to simple recrystallization from water to obtain some degree of purification. However, because of the high solubility of acrylamide in water, the process is wasteful.

SUMMARY OF THE INVENTION

It has now been discovered that acrylamide containing such cross-linking organic impurities is conveniently and effectively purified by a process comprising multiple recrystallization from water solution wherein the novel and essential feature is the use in each recrystallization stage of mother liquor from the next following such stage as at least the principal part of the aqueous recrystallizing medium. The new process is thus a countercurrent multiple recrystallization consisting of a first recrystallization stage, at least one intermediate such stage, and a final recrystallization stage wherein a mixture of the final mother liquor and fresh water is the recrystallizing solvent. In the operation of the process, aqueous impure acrylamide is the feed for the first recrystallization stage and a portion of the mother liquor flowing from the second stage into the first is bled off and discarded to eliminate part of the concentrated impurities. Preferably, the process is operated continuously in a progression of dissolving and crystallizing cycles at appropriate temperatures and concentrations.

DESCRIPTION OF THE DRAWINGS

FIG. 1 illustrates a batchwise adaptation of the process with five crystallization stages and a purified product flowing from the final stage as an aqueous solution. The feed solution $F_0$ is shown being introduced into the system at an intermediate crystallization stage. It could also be introduced into Stage 2 or into Stage 1 in combination with the recycle stream $F_1$ from the concentrator. The concentrator E is preferably a vacuum evaporator. Operation of the process in this apparatus comprises the following sequence of steps:

Figure 2:
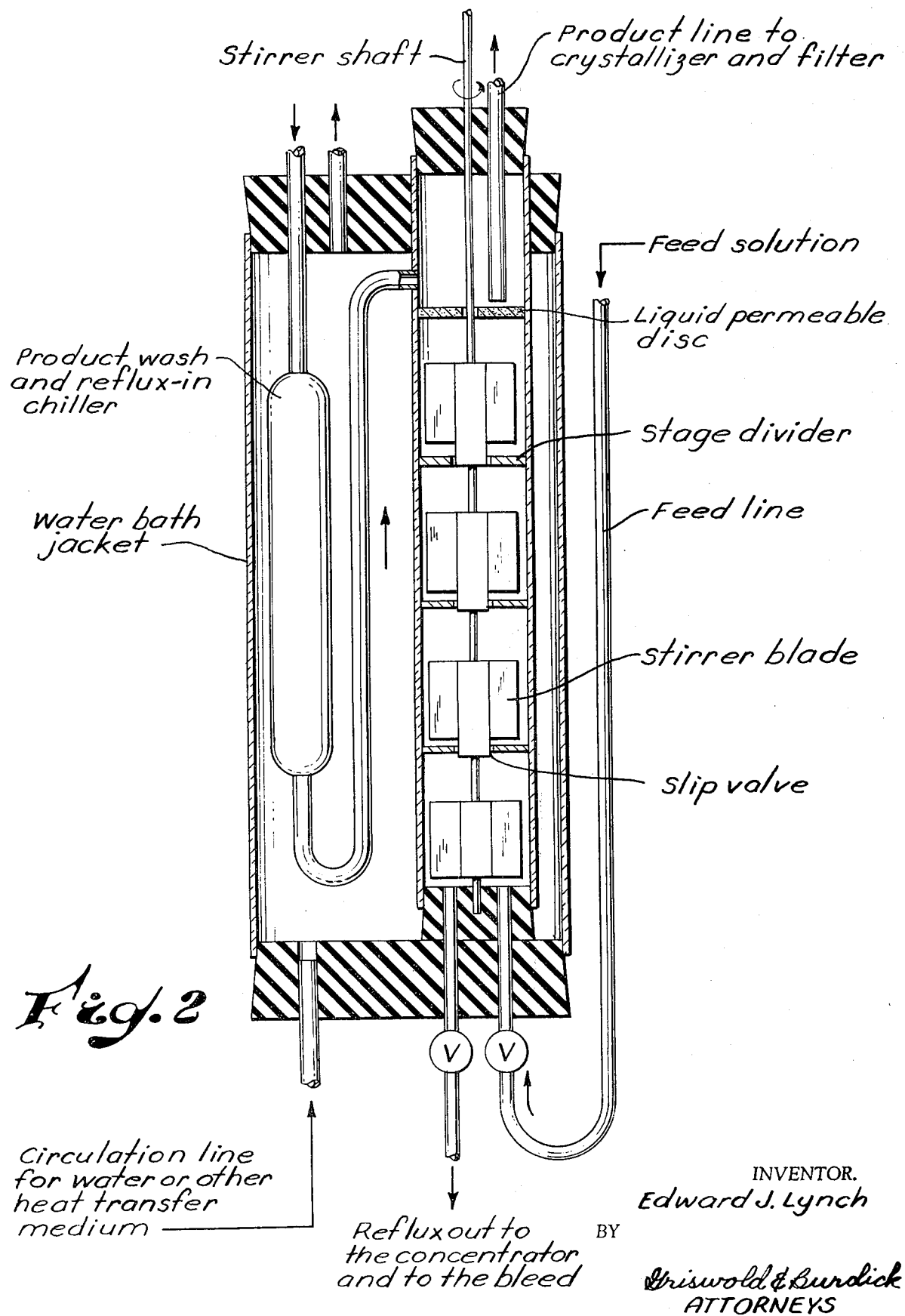

1. Cool all stages so that more than one-half of the acrylamide in each stage crystallizes.
2. Enter reflux, R, in stage 5, displacing mother liquor $L_5$ into stage 4, displacing mother liquor $L_4$ from stage 4 into stage 3, etc., while maintaining temperature.
3. Liquor $L_1$ from stage 1 enters the concentrator where some solvent is removed. This enriched liquid becomes the feed $F_1$ to stage 1. An impurity bleed stream is taken from the stage 1 liquid.
4. Heat all stages to dissolve the crystals. Recool to give a new solid-liquid equilibrium.
5. Enter water in stage 5 (this may have some reflux added to give the proper concentration). This displaces liquid in all other stages as in steps 2 and 3.
6. Heat all stages to dissolve the crystals.
7. Enter concentrate, $F_1$, displacing liquid M forward in each stage, and producing product solution $M_5$ from stage 5.
8.* (For a solid product) Cool product solution $M_5$ to crystallize most of the acrylamide, separate the crystals and return the filtrate as reflux.
9. Repeat the above steps.
10. The feed to the process, $F_o$, equal in quantity to the bleed and product streams, can be entered in whichever stage is most appropriate. Feed must be of the proper concentration so that the heating and cooling cycles can be maintained.

* In the event that product is taken as liquid, then some water is added to the reflux stream to get the proper concentration.

FIG. 2 is a representation of a multistage countercurrent recrystallizer column having the stages stacked one on top of another and designed for operation of the present process essentially as described in FIG. 1. The feed solution is shown entering the first recrystallization stage, but it could as well be introduced at any point from the bottom to about the middle of the column. The column is of course adaptable to the recrystallization of various compounds, organic or inorganic, from water or from other solvents, given the solubility characteristics necessary for such purification.

The crystallizer column itself consists essentially of an elongated cylindrical housing, vertically disposed in use, defining a plurality of serially connected chambers or crystallization stages of approximately equal volume separated by divider partitions, each provided with stirring means actuated by a shaft disposed essentially along the vertical axis of the column, the shaft passing through a bore in each divider partition separating adjacent crystallization chambers and in each partition, valve means, designed to permit the flow of liquid between the chambers. Preferably, the valve means is a slip valve as shown in FIG. 2 defined by the bore and shaft or means coupled to the shaft whereby the portion of shaft at the juncture of shaft and bore is larger than the adjacent portion of the shaft and the shaft is vertically displaceable to permit liquid flow through the bore. A feed solution inlet is provided at about the midpoint lower point on the column, there is a mother liquor outlet from the first or bottom crystallization chamber, a product stream outlet from the final or topmost chamber, and an inlet in that chamber for introduction of product wash and reflux solution. Ordinarily, the column contains 2–10 and preferably 3–6 stages. The series of chambers is substantially enclosed by a heat-exchanging jacket whereby the temperature of the chambers can be adjusted and maintained at a desired level.

In operation, the column is cooled, thereby crystallizing about two-thirds of the monomer in each stage. Cold reflux is introduced, displacing liquid in each stage into the preceding stage. The column is then heated and recooled to achieve a new equilibrium. Cold product wash solution is introduced, again displacing liquid in each stage into the preceding stage.

The column is heated and feed solution is introduced, displacing liquid in each stage forward to the next stage, with liquid from the last stage being displaced from the column as product. This product stream is cooled to recover about half of the monomer, the other half being returned as reflux.

Reflux displaced from the column goes partially to the evaporator for water removal and partially to the evaporator crystallizer to dissolve feed crystals and move them into the column. A bleed is taken from these reflux-out streams as a means of removing impurities from the system.

FIG. 3 is a schematic diagram of a system for continuous operation of the countercurrent crystallization process described above. As in FIG. 1, E is a concentrator, preferably a vacuum evaporator, wherein mother liquor streams $L_1$ and $L_2$ from coolers $C_1$ and $C_2$ and filters $F_1$ and $F_2$ are combined and concentrated to the desired extent with recovered water being recycled to the system via dissolver $D_5$. $S_1$ through $S_5$ represent the solid crystallized products from the successive crystallization stages. $M_1$ through $M_5$ and $M_p$ represent the concentrate feeds to the respective crystallizers. The aqueous stream $F_o$ is shown entering the system at the intermediate stage $D_2$.

DETAILED DESCRIPTION

In both batchwise and continuous operation of the countercurrent multiple crystallization process, the aqueous acrylamide solution is cooled to between about −9°C and about 5°C, preferably to about −3°C to 2°C, to cause crystallization. The redissolving phase is carried out at about 20°–40°C, preferably at about 25°–35°C. These temperature limits effectively define the limits of acrylamide concentration during various stages of the process. For example, the mother liquor streams in the process contain about 31–46 percent by weight of acrylamide while the acrylamide solutions in the redissolving phase will run about 60–77 percent concentration.

The following examples illustrate typical operation of the process in batchwise and continuous fashion.

EXAMPLE 1

Using a laboratory scale crystallizer as shown in FIG. 2, a commercial grade of acrylamide was purified to reduce the cross-linking impurity content from an initial value of about 20 parts per million to less than one part in the finished product. The feed stream entering the bottom of the crystallizer column was aqueous acrylamide of about 68% concentration. In the crystallization cycle of the process, the column was cooled to 0°C, thereby crystallizing about two-thirds of the acrylamide in each chamber. Cold reflux (41% aqueous acrylamide from crystallization of the product stream) was then introduced into the topmost chamber of the column to displace the liquid from each chamber into the preceding one. The column was then heated to 30°C to dissolve all the crystals and recooled to achieve a new equilibrium. Product wash water (about 17% aqueous acrylamide) was then introduced into the top chamber of the column to displace the liquid and the column was again heated to 30°C and feed liquid was introduced into the bottom chamber, thereby displacing the liquid from the top chamber as the product stream. This product stream was cooled to crystallize about two-thirds of the acrylamide present. The crystals were separated and dried and the cycle of operation was repeated.

Four separate samples of acrylamide were recrystallized as described above and the practical effect of the purification process on the quality of the monomer was demonstrated by the change in properties of polymers prepared from them as described below.

POLYMERIZATION

A mixture of four parts by weight of acrylamide and one part of sodium acrylate was dissolved in water to make a 15% monomer solution and 100 ppm ethylenediaminetetraacetic acid, 50 ppm of $K_2S_2O_8$, and 75 ppm of tert-butyl hydroperoxide, based on total monomer, were added. The monomer solution was put in glass ampoules and purged with nitrogen, then the ampoules were sealed and heated in a water bath at 50°C for eight hours. The resulting polymer gel was used without further treatment to prepare test solutions.

SCREEN FACTOR DETERMINATION

A sample of polymer gel as prepared above was dissolved in 3% aqueous NaCl to make a 0.05% polymer solution. Differences in molecular weight and molecular structure in the various samples of polymer thus prepared were measured by determination of "screen factors" of the dilute polymer solutions. These determinations were made in what is essentially an Ostwald viscosimeter wherein the orifice is replaced by a pack of 5 0.25 inch diameter circles of 100 mesh stainless steel screen. The ratio of the flow time of a measured volume of solution, 30 ml. in this case, to the flow time through the screen pack of the same volume of water is the screen factor of the solution, usually determined at room temperature (about 23°C). The screen factors of these polymer solutions were measured before and after filtering through a No. 10 Selas candle filter and the difference between the two values in each case was taken as a measure of the presence of gel or gel-like particles resulting from cross-linking impurities in the starting acrylamide.

| Polymer from Acrylamide Sample No. | Screen Factor (before filtering) | Loss in Screen Factor on Filtering |
|---|---|---|
| Original Monomer (2 Samples) | 102.8 68.3 | 83.1 60.7 |
| Purified No. 1 | 77.8 | 21.6 |
| Purified No. 2 | 79.5 | 12.2 |
| Purified No. 3 | 89.2 | 20.7 |
| Purified No. 4 | 89.2 | 25.8 |

EXAMPLE 2

A batchwise adaptation of the same process using flows as outlined in FIG. 1 was carried out using beakers and filters as the various elements in the crystallizer stages. The feed was acrylamide similar to that used in Example 1. Three crystallization stages were run to obtain a purified product recovery of about 90%. Polymer made from the purified crystals as in Example 1 had a screen factor of 72.3 before filtering and a screen factor loss on filtration of only 15.5.

EXAMPLE 3

Using figures obtained from a batchwise simulation of the continuous crystallization process outlined in FIG. 3, concentrations and quantities were calculated for production of ten parts by weight of finished acrylamide crystals using dissolver and crystallizer temperatures of 30°C and 0°C respectively. The results are listed below.

| Stream | Total Weight | Acrylamide Weight | Acrylamide Conc. (%) | Stream Transfer Temperature |
|---|---|---|---|---|
| $M_1$ | 33.7 | 19 | 56.5 | 30°C |
| $M_2$ | 33.9 | 19.1 | 56.5 | 30°C |
| $M_3$ | 44.9 | 29.1 | 64.8 | 30°C |
| $M_4=M_5$ | 44.7 | 29 | 64.8 | 30°C |
| $M_P$ | 47.6 | 19.5 | 41 | 0°C |
| Product | — | 10 | — | 0°C |
| $L_1=L_1=$ | 23.2 | 9.5 | 41 | 0°C |
| $L_3=L_P$ | | | | |
| $L_2=L_3$ | 23.4 | 9.6 | 41 | 0°C |
| $S_1=S_2$ | 10.5 | 9.5 | 90 | 0°C |
| $S_3=S_4=S_5$ | 21.5 | 19.5 | 90 | 0°C |
| Solvent | 12.7 | 0 | 0 | 30°C |
| $F_o$ | 11.2 | 10.1 | 90 | 30°C |
| Bleed | 0.2 | 0.1 | 41 | 0°C |

I claim:

1. A countercurrent recrystallizer column comprising an elongated cylindrical housing defining a plurality of serially connected chambers of about equal volume separated by dividing partitions, each of said partitions having a bore adapted to receive a shaft, said bores being axially aligned in said housing, a rotatable shaft passing through the bores, stirring means attached to the shaft in each chamber, liquid flow valve means communicating between adjacent chambers, means for withdrawing liquid from each end chamber and means for introducing liquid into each end chamber, and a single heat-exchanging jacket substantially enclosing said series of chambers, said liquid flow valve means being a slip valve defined by the juncture of said shaft and the bore in each divider partition, the portion of said shaft at said juncture being larger than a portion of said shaft immediately adjacent said juncture and said shaft being vertically displaceable to permit fluid flow through said bore.

* * * * *

UNITED STATES PATENT AND TRADEMARK OFFICE
CERTIFICATE OF CORRECTION

PATENT NO. : 3,902,855
DATED : September 2, 1975
INVENTOR(S) : Edward J. Lynch

It is certified that error appears in the above-identified patent and that said Letters Patent are hereby corrected as shown below:

Col. 2, line 67, after the word "point" (first occurrence) insert the word --or--

Signed and Sealed this second Day of December 1975

[SEAL]

Attest:

RUTH C. MASON
*Attesting Officer*

C. MARSHALL DANN
*Commissioner of Patents and Trademarks*